United States Patent Office 3,850,951
Patented Nov. 26, 1974

3,850,951
TRIAZOLOBENZODIAZEPINE 5N-OXIDE DERIVATIVES
Kanji Meguro and Yutaka Kuwada, Takarazuka, Hyogo, Japan, assignors to Takeda Chemical Industries, Ltd., Osaka, Japan
No Drawing. Filed Aug. 20, 1971, Ser. No. 173,635
Claims priority, application Japan, Aug. 26, 1970, 45/74,749
Int. Cl. C07d 57/02
U.S. Cl. 260—308 C    1 Claim

ABSTRACT OF THE DISCLOSURE

Compounds of the formula

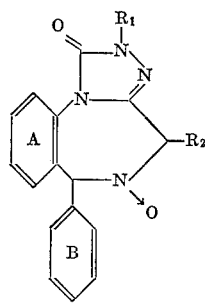

wherein $R_1$ represents alkyl having up to 6 carbons, $R_2$ represents hydrogen or alkyl having up to 6 carbons and each of the rings A and B is unsubstituted or has one or more substituents selected from the group consisting of nitro, trifluoromethyl, halogen, lower alkyl and lower alkoxy. The compounds are prepared by alkylating a compound of the formula

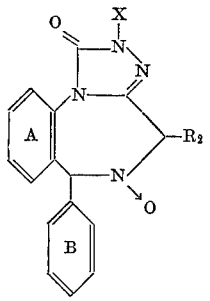

wherein X represents hydrogen or alkali metal.

The compounds are useful as tranquilizer, muscle relaxant, anticonvulsant, sedative and sleep inducer agents.

---

This invention relates to a novel and pharmaceutically useful triazolobenzodiazepine 5N-oxide derivative of the formula

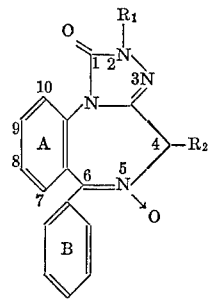

wherein $R_1$ represents alkyl having up to 6 carbons, $R_2$ represents hydrogen or alkyl having up to 6 carbons and each of the rings A and B is unsubstituted or has one or more substituents selected from the group consisting of nitro, trifluoromethyl, halogen, lower alkyl and lower alkoxy and to a method for production therefor.

Referring to the formula (I), alkyl having up to 6 carbons represented by $R_1$ can, for example, be methyl, ethyl, propyl, isopropyl, butyl, isobutyl, sec-butyl, tert-butyl, amyl and hexyl. The alkyl having up to 6 carbons represented by $R_2$ can be exemplified by those of $R_1$. Lower alkyl which can be attached as substituent(s) to each of the rings A and B can be one having up to 3 carbons such as methyl, ethyl, propyl and isopropyl.

Halogen which can be attached as substituent(s) to each of the rings A and B includes chlorine, bromine, iodine and fluorine.

Lower alkoxy which can be attached as substituent(s) to each of the rings A and B can be one having up to 3 carbons such as methoxy, ethoxy, propoxy and isopropoxy.

The principal object of the present invention is to provide novel triazolobenzodiazepine 5N-oxide derivatives (I) which are useful as tranquilizer, muscle relaxant, anticonvulsant, sedative and sleep inducer agents.

Another object is to provide a novel process for production of the compound (I).

The compounds (I) of the present invention can be prepared by a process which comprises alkylating a compound of the formula

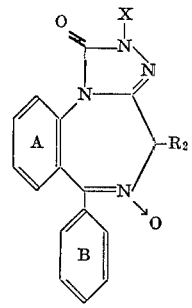

(II)

wherein X represents hydrogen or alkali metal and the other symbols have the meaning given above with an alkylating agent containing the alkyl group of $R_1$.

The starting material (II) can be prepared, for instance, by the process outlined below:

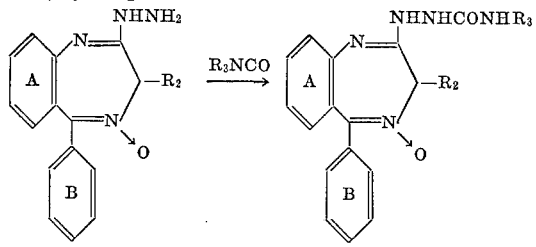

ring-closure under heating

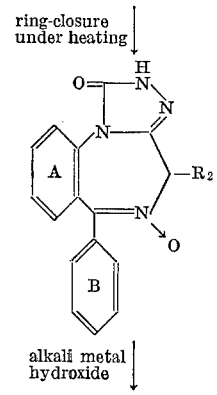

alkali metal hydroxide

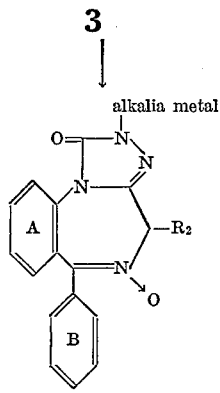

wherein $R_3$ represents alkyl (e.g., methyl and ethyl) and other symbols have the meaning given above.

In the process of the present invention, the compound (II) is allowed to react with the alkylating agent containing the group of $R_1$. The alkylation can be conducted after *pe se* conventional manner. The alkylating agent employable in the present process can be a *per se* conventional one such as alkyl halide of the formula

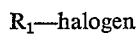

wherein halogen includes chlorine, bromine and iodine and $R_1$ has the meaning given above and dialkyl sulfate of the formula

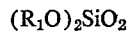

wherein $R_1$ has the meaning given above.

The amount of the alkylating agent employed in practice is from about 1 to about 5 moles per mole of the compound (II).

The present reaction can be conducted at a suitable temperature from about 0° C. to about 100° C. and is generally conducted at room temperature.

The present reaction is generally conducted in the presence of a suitable solvent such as alcohol (e.g. methanol and ethanol), aromatic hydrocarbon (e.g. benzene, toluene and xylene), dimethylformamide and dimethyl sulfoxide.

In the present process, the starting compound (II) wherein X is alkali metal is more reactive than the compound (II) wherein X is hydrogen. Therefore, when the compound (II) wherein X is hydrogen is employed as the starting material, it is recommended to conduct the present process after converting it to the compound (II) wherein X is alkali metal with alkali metal hydroxide (e.g. sodium hydroxide, potassium hydroxide), alkali metal alkoxide (e.g. sodium methoxide, sodium ethoxide and potassium butoxide), alkali metal amide (e.g. sodium amide and potassium amide) or alkali metal hydride (e.g. sodium hydride and lithium hydride), or to conduct the present reaction in the presence of the above mentioned reagent.

The compounds (I) can easily be isolated in optional purity from the resulting mixture by *per se* conventional separation and purification means such as evaporation, extraction and recrystallization.

The compounds (I) show tranquilizing, muscle relaxing, anticonvulsive, sedative and sleep inducing effects. Therefore, they can be used effectively and safely as tranquilizer, muscle relaxant, anticonvulsant, sedative and sleep inducer.

The objective compounds of the present invention can be administered as they are or in a form of a suitable pharmaceutical composition such as powder, granules, tablets and injection prepared with the use of pharmaceutically acceptable carrier or adjuvant.

Although dosage of the objective compound varies with the kinds of the compounds, symptom of diseases, etc., usual dosage is in the range from about 1 to about 30 mg./day, for adult human.

Reference 1

To a solution of 3 g. of 7-chloro-2-hydrazino-5-phenyl-3H-1,4-benzodiazepine 4N-oxide in 60 ml. of pyridine is added 0.7 ml. of methyl isocyanate under ice-cooling, and the mixture is stirred. After 30 minutes' stirring, the resulting precipitates are collected by filtration, washed with methanol and dried, whereby 7-chloro-2-(4-methyl-semicarbazido)-5-phenyl-3H-1,4-benzodiazepine 4N-oxide is yielded as crystals. Recrystallization from dimethylformamide-water gives colorless fine needles melting at 251–252° C. (decomposition).

A solution of 3 g. of 7-chloro-2-(4-methylsemicarbazido) 5-phenyl-3H-1,4-benzodiazepine 4N-oxide in a mixture of 60 ml. of pyridine and 140 ml. of dimethylformamide is refluxed for 8.5 hours. The solvent is removed by distillation under reduced pressure. The residue is treated with aqueous ethanol, whereby 8-chloro-6-phenyl-2,4-dihydro-1H-s-triazolo[4,3-a][1,4]benzodiazepin - 1 - one 5N-oxide is yielded as crystals. Recrystallization from methanol gives 8-chloro - 6 - phenyl-2,4-dihydro-1H-s-triazolo[4,3-a][1,4]benzodiazepin - 1 - one 5N-oxide monomethanolate as yellow prisms melting at 164–166° C. (foaming).

When the oxide is recrystallized from aqueous ethanol, 8-chloro-6-phenyl - 2,4 - dihydro - 1H - s - triazolo[4,3-a][1,4]benzodiazepin - 1-one 5N - oxide monohydrate is yielded as yellow prisms melting at 173–174° C. (softening).

The following starting compounds are prepared in a similar manner to that in Reference 1.

8-Chloro-6-(4-chlorophenyl) - 2,4 - dihydro-1H-s-triazolo-[4,3-a][1,4]benzodiazepin - 1 - one 5N-oxide; colorless prisms from methanol, melting point 188–190° C.
8-Nitro-6-phenyl-2,4-dihydro-1H-s-triazolo[4,3-a][1,4] benzodiazepin-1-one 5N-oxide; yellow prisms from acetone ethyl acetate, melting point 208–210° C.
6-Phenyl-8-trifluoromethyl 2,4-dihydro-1H-s-triazolo [4,3-a][1,4]benzodiazepin-1-one 5N-oxide; colorless prisms from acetone-n-hexane, melting point 171–173° C. (sinter).

Example 1

To a solution of 7.2 g. of 8-chloro-6-phenyl-2,4-dihydro-1H-s-triazolo[4,3-a][1,4]benzodiazepin - 1 - one 5N-oxide methanolate in 120 ml. of dimethylformamide is added 20 ml. of 2N aqueous solution of sodium hydroxide, and the mixture is stirred for 10 minutes, followed by addition of 2.4 ml. of methyl iodide. The mixture is stirred for 1.5 hours, followed by addition of 350 ml. of water. The mixture is extracted with ethyl acetate and the ethyl acetate layer is washed with water and dried over sodium sulfate. The solvent is distilled off. The residue is recrystallized from a small amount of methyl ethyl ketone, whereby 8-chloro-2-methyl-6-phenyl-2,4-dihydro-1H-s-triazolo[4,3-a][1,4]benzodiazepin - 1 - one 5N-oxide is yielded as colorless needles melting at 223–226° C. (decomposition).

*Elementary analysis.*—Calculated for $C_{17}H_{18}ClN_4O_2$: C, 59.92; H, 3.85; N, 16.44. Found: C, 59.79; H, 3.86; N, 16.84.

Example 2

To a solution of 1.8 g. of 8-chloro-6-phenyl-2,4-dihydro-1H-s-triazolo[4,3-a][1,4]benzodiazepin - 1 - one 5N-oxide methanolate in 30 ml. of dimethylformamide is added 5 ml. of 2N aqueous solution of sodium hydroxide and the mixture is stirred for 10 minutes. Then 1.2 ml. of ethyl iodide is added thereto and the mixture is stirred for 4 hours, followed by addition of water. The resulting precipitates are collected by filtration and are recrystallized from a mixture of chloroform and methanol, whereby 8 - chloro-2-ethyl-6-phenyl-2,4-dihydro-1H-s-triazolo[4,3-a][1,4]benzodiazepin - 1 - one 5N - oxide is yielded as colorless prisms melting at 250–253° C. (decomposition).

*Elementary analysis.*—Calculated for $C_{18}H_{15}ClN_4O_2$: C, 60.93; H, 4.26; N, 15.79. Found: C, 60.69; H, 4.20; N, 15.96.

The following compounds are prepared in a similar manner to that described in Example 1 or 2.

2-Methyl-8-nitro-6-phenyl-2,4-dihydro-1H-s-triazolo [4,3-a][1,4]benzodiazepin-1-one 5N-oxide;
Yellow needles from chloroform-methanol
Melting point 237–239° C.

*Elementary analysis.*—Calculated for $C_{17}H_{13}N_5O_4$: C, 58.12; H, 3.73; N, 19.94. Found: C, 57.86; H, 3.63; N, 19.75.

8-Chloro-6-(4-chlorophenyl)-2-ethyl-2,4-dihydro-1H-s-triazolo[4,3-a][1,4]benzodiazepin-1-one 5N-oxide;
Colorless prisms from methanol
Melting point 204–205° C.

*Elementary analysis.*—Calculated for $C_{18}H_{14}Cl_2N_4O_2$: C, 55.54; H, 3.62; N, 14.39. Found: C, 55.76; H, 3.52; N, 14.35.

2-Ethyl-6-phenyl-8-trifluoromethyl-2,4-dihydro-1H-s-triazolo[4,3-a][1,4]benzodiazepin-1-one 5N-oxide;
Colorless fine prisms from chloroform-methanol
Melting point 261–262° C.

*Elementary analysis.*—Calculated for $C_{19}H_{15}F_3N_4O_2$: C, 58.76; H, 3.89; N, 14.43. Found: C, 58.46; H, 3.62. N, 14.33.

What is claimed is:
1. The compound 8-chloro-2-methyl-6-phenyl-2,4-dihydro - 1H - s - triazolo[4,3-a][1,4]benzodiazepin-1-one 5N-oxide.

References Cited
UNITED STATES PATENTS 3,646,055   2/1972   Hester _____ 260—308 R

FOREIGN PATENTS 6916543   5/1970   Netherlands _____ 265—308 R

OTHER REFERENCES

Gordon: Psychopharmacological Agents, vol. I, (Academic Press, 1964, pp. 161–178.

Sternbach et al.; Symposium on CNS Drugs, "A Symposium Held at the Regional Research Laboratory, Hyderabad, India," CSIR, New Delhi, India, 1966, pp. 3–5 of reprint of pp. 53–69. 260/239BD.

ALTON D. ROLLINS, Primary Examiner

U.S. Cl. X.R.

260—239 BD; 424—269